Patented Mar. 9, 1926.

1,575,678

UNITED STATES PATENT OFFICE.

JAROSLAV FRÖHLICH, OF BASEL, SWITZERLAND, ASSIGNOR TO SOCIETY OF CHEMICAL INDUSTRY IN BASLE, OF BASEL, SWITZERLAND.

DYESTUFFS AND PROCESS OF MAKING SAME.

No Drawing. Application filed October 21, 1924. Serial No. 745,022.

*To all whom it may concern:*

Be it known that I, JAROSLAV FRÖHLICH, a citizen of the Swiss Confederation, and residing at Basel, Switzerland, have invented useful new Dyestuffs and Processes of Making Same, of which the following is a full, clear, and exact specification.

The present invention relates to new vat dyestuffs which are particularly valuable for producing fast tints on the animal fibre. The invention comprises the new dyestuffs, the method of making same, and the material dyed with the new vat dyestuffs.

It has been found that valuable vat dyestuffs are obtained by causing sulfur dichloride to act upon 2:5-diarylidobenzoquinones. This reaction may be conducted in presence of a diluent and with addition of an agent which binds acids, as for example sodium acetate or magnesium oxide, and a condensing agent, as for example sulphuric acid. The temperature and the proportion which the reacting substances bear to each other may be varied within wide limits.

For obtaining dyestuffs of a darker tone it is in general advantageous to operate at higher temperatures which may rise to the boiling point of the diluent, as for instance nitrobenzene.

Particularly suitable for the reaction are 2:5-diarylidobenzoquinones, which are not substituted or are only mono-substituted (in 3- or 6-position) in the quinone nucleus. They react even at ordinary temperature with dyestuff formation, whereas the 3:6-di-substitution-derivatives in most cases require a higher temperature. The 2:5-diarylidobenzoquinones, the manufacture of which is generally known, may be derived from two aromatic amines which may be the same or different and may be mono-substituted at the nitrogen or mono- or poly-substituted at any position in the nucleus. As substituents there may be named, among others, halogen, alkyl-, alkoxyl- ($OCH_3$), phenyloxy- ($OC_6H_5$), nitro-, amino-, alkylamino-, aralkylamino-, phenylamino-, hydroxyl- or carboxyl-groups.

The dyestuffs thus obtained form dark, yellow to dark blue and black powders and contain sulphur and mostly also halogen. They dissolve in concentrated sulphuric acid to a brown to red-violet and blue-green solution. With hydrosulphite and caustic soda lye they give light yellow to brown vats from which wool is dyed fast yellow-brown to red-brown, olive-green, green-blue and grey tints.

The following examples illustrate the invention without, however, limiting the scope of the same, the parts being by weight:—

*Example 1.*

14.5 parts of 2:5-dianilidobenzoquinone corresponding with the formula:

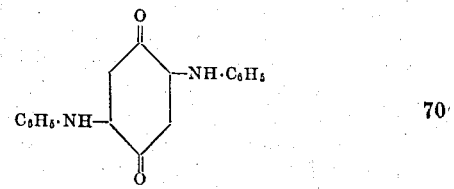

are stirred into 10 parts of nitrobenzene and mixed gradually at 5° C. with 11.3 parts of sulphur dichloride ($SCl_2$). Stirring is continued at this temperature for a long time, whereupon dilution with alcohol and filtration of the dyestuff which has separated follow. The dyestuff is a brown powder soluble in concentrated sulphuric acid to a blue-violet solution and yielding a bright vat which dyes wool blackish brown tints.

*Example 2.*

290 parts of dry nitrobenzene and 29 parts of 2:5-dianilidobenzoquinone are mixed and cooled, while stirring well, to 5° C. and in the course of an hour are mixed with 34 parts of sulphur dichloride. After continued stirring the whole is filtered and the solid product washed and dried. There is thus obtained a brown powder which dissolves in concentrated sulphuric acid to a violet-blue solution and dyes wool in a hydrosulphite vat full, fast brown tints. If in this example the temperature is raised in the course of a few hours to 50–60° C. there is obtained a dyestuff which dissolves in concentrated sulphuric acid to a dirty violet solution and produces on wool a dark brown. If the operation is carried out at still higher temperatures, such as 100–110° C., a dark red dyestuff is obtained which dissolves in concentrated sulphuric acid to a violet solution and produces a dark red-brown tint on wool. If the reaction is carried out at a still higher temperature, for example at the boiling point of the mixture, there is obtained a dark brown dyestuff which dissolves in strong sulphuric acid to a reddish-blue solution and dyes wool in a hydrosulphite vat fast grey to blackish shades. If the condensation is carried out in concentrated sulphuric acid at ordinary temperature a dyestuff is obtained which dyes wool olive tinged brown shades.

*Example 3.*

72 parts of 2:5-dianilidobenzoquinone are suspended in 1,440 parts of nitrobenzene with addition of 82 parts of calcined sodium acetate. The suspension is mixed gradually at 5° C. with 80 parts of sulphur dichloride and thoroughly stirred for a long time. By filtration and washing with alcohol there is obtained a brown powder which dissolves in concentrated sulphuric acid to a reddish-violet solution and dyes wool in a hydrosulphite vat yellow-olive. By substituting magnesia for the acetate and heating the mixture gradually to 100–110° C. there is obtained a dark red powder which dissolves in concentrated sulphuric acid to a violet solution and dyes wool dark red-brown tints. If the temperature is carried to the boiling point of the suspension agent there is obtained in the presence of magnesia a blue powder which dissolves in concentrated sulphuric acid to a dirty blue solution and dyes wool blue-grey in the vat.

*Example 4.*

81 parts of 2:5-dianilido-6-chloro-1:4-benzoquinone corresponding with the formula

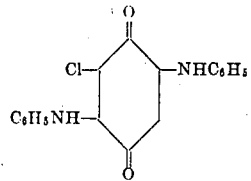

are suspended in 1,600 parts of nitrobenzene and mixed at 5° C. with 13 parts of sulphur dichloride. The whole is stirred for a long time at 5–8° C. Filtration, washing and drying follow as usual. The new dyestuff is a bright brown powder, soluble in strong concentrated sulphuric acid to a red-violet solution and dyeing wool in the vat yellow-brown.

By increasing the proportion of sulphur dichloride the tint of the dyestuff is shifted towards red. For example, in the above mixture the use of 26 parts of sulphur dichloride produces a dyestuff which is a reddish-brown powder soluble in concentrated sulphuric acid to a somewhat bluer solution than that of the preceding dyestuff and dyeing wool in the vat orange-brown, whereas the use of 78 parts of sulphur dichloride leads to a dyestuff which dyes somewhat redder tints.

If the operation is not conducted in the cold, but the mixture is heated gradually to 100° C. and left for some time at 100–120° C. there is produced a dyestuff which dyes a brown-red; if the temperature is raised to the boiling point a product which dyes blackish-violet-brown is produced.

A brown-dyeing product which dissolves in sulphuric acid to a violet-blue solution is further obtained by causing sulphur dichloride to react for a short time upon 2:5-dianilido-6-chloro-1:4-benzoquinone at low temperature and in the absence of a diluent.

*Example 5.*

78 parts of 2:5-dianilido-6-methylbenzoquinone are suspended in 1,000 parts of nitrobenzene and the suspension is mixed at 5° C. with 26 parts of sulphur dichloride. The whole is stirred for some time, whereby a red-brown powder is obtained which dissolves in concentrated sulphuric acid to a reddish-violet solution and dyes wool in the vat full yellow-brown tints. By substituting 78 parts of sulphur dichloride for the 26 parts there is obtained a product which dissolves in sulphuric acid to a dull violet-red solution and yields red-brown tints on wool. By addition of magnesia and raising the temperature to the boiling point of the mixture the dyestuff produced dissolves in sulphuric acid to a dark yellow-brown solution and dyes wool in the vat olive.

*Example 6.*

90 parts of 2:5-dianilido-3:6-dichlorobenzoquinone are mixed with 1,200 parts of nitrobenzene and 78 parts of sulphur dichloride, and the mixture is heated to boiling and is then diluted with alcohol and filtered; the dyestuff is washed. It is a dark brown-black, dissolves in sulphuric acid to a dirty olive solution and dyes wool in the vat blue-grey.

The following table exhibits the main properties of a number of dyestuffs which can be obtained by the present invention:—

| Diarylidoquinone. | Sulphur halogen compounds. | Solvent. | Temperature. | Appearance of the dyestuff powder. | Colour of the solution in sulphuric acid. | Dyeing on wool in the vat. |
|---|---|---|---|---|---|---|
| 2:5-para-para-dichlorodianilido benzoquinone. | 1–3 mol. sulphur dichloride. | Nitrobenzene | Cold | Red brown | Red to violet | Yellow-brown. |
| Do. | 3 mol. sulphur dichloride. | do. | 100° C. up to boiling. | Brown to greenish blue. | Reddish-blue to grey-blue. | Violet-brown to grey. |

| Diarylidoquinone. | Sulphur halogen compounds. | Solvent. | Temperature. | Appearance of the dyestuff powder. | Colour of the solution in sulphuric acid. | Dyeing on wool in the vat. |
|---|---|---|---|---|---|---|
| 2:5-ortho-ortho-dichlorodi-anilido-benzo-quinone. | 3 mol. sulphur dichloride. | Nitro-benzene. | 100° C. up to boiling. | Brown-black. | Blue-grey to dull green. | Grey. |
| 2:5-para-para-ditoluidido-benzo-quinone. | ...do. | ...do. | Cold up to boiling. | Brown to dark blue. | Blue to dull green. | Violet-grey to greenish-grey. |
| 2:5-meta-meta-di-toluidido-benzo-quinone | 1 mol. sulphur dichloride. | ...do. | Cold. | Dark brown. | Reddish-violet. | Olive-brown. |
| 2:5-dimeta-xylidido-benzoquinone. | 3 mol. sulphur dichloride. | ...do. | 100° C. | Olive. | Bluish-grey. | Blue-grey. |
| 2:5-di-ortho-anisidido-benzo-quinone. | 3 mol. sulphur dichloride. | ...do. | 100° C. up to boiling. | Dark blue to dark green. | Green-blue to blue-green. | Olive-green. |
| 2:5-di-ortho-phenetidido-benzo-quinone. | ...do. | ...do. | ...do. | Black to greenish black. | Green-blue. | Olive to bluish-green. |
| 2:5-dipara-anisidido-benzoquinone. | ...do. | ...do. | Cold up to boiling. | Brown-black to dark blue. | Blue to greenish blue. | Violet-grey to grey-blue. |
| 2:5-dipara-phenetidido-benzo-quinone. | ...do. | ...do. | 100° C. up to boiling. | Blue-black to dark blue. | Dull green-blue to dull blue-green. | Blue-grey to green-grey. |
| 2:5-di-ortho-phenylether-anilido-benzo-quinone. | ...do. | ...do. | Boiling. | Blackish green. | Bluish-grey. | Blue-green. |
| 2:5-di-para-phenylether-anilido-benzoquinone. | 3 mol. surphur dichloride. | Nitrobenzene. | Cold up to boiling. | Dark red-brown to black. | Dirty blue to olive. | Brown to green-blue. |
| 2:5-di (α-naphthylamido)-benzoquinone. | 1-3 mol. sulphur dichloride. | ...do. | ...do. | Dark blue. | Dull green to blue-green. | Violet - brown, blue - grey to greenish grey. |
| 2:5 - dibenzylanilidobenzoquinone. | 3 mol. sulphur dichloride. | ...do. | ...do. | Blue. | Dull blue. | Blue-grey. |
| 2:5-di-monomethyl anilidobenzoquinone. | ...do. | ...do. | ...do. | Blue - grey to black. | Dull green. | Blue - grey to green-grey. |
| 2:5 - di - orthonitranilido-benzoquinone. | ...do. | ...do. | 100° C. up to boiling. | Black-brown to brown black. | Red-brown to dull yellow-green. | Red - brown to grey. |
| 2:5-dimeta-nitranilido-benzoquinone. | 1-3 mol. sulphur dichloride. | ...do. | Cold up to boiling. | Brown to black. | Brown to blue-green. | Brown to grey. |
| 2:5 - dipara-oxyanilido-benzoquinone. | ...do. | ...do. | ...do. | Red - brown to black. | Blue. | Yellow - brown, olive-brown to grey. |
| 2:5-dianilidobenzoquinone. | 3 mol. sulphur dichloride. | Glacial acetic acid. | Cold. | Dark brown. | Dull blue. | Brown. |
| Do. | ...do. | Formic acid. | Cold up to 60° C. | Brown. | Reddish - violet to blue. | Olive to grey. |
| Do. | ...do. | α - chloronaphthalene. | Cold. | Dark brown. | Violet. | Yellow-brown. |
| Do. | ...do. | Orthodichlorobenzene. | Cold. | Chocolate brown. | ...do. | Do |
| Do. | ...do. | Chlorobenzene. | Cold. | ...do. | ...do. | Do. |
| Do. | ...do. | Benzene. | Cold. | ...do. | Dirty red violet. | Olive-brown. |

What I claim is:—

1. As a new process, the manufacture of vat dyestuffs, which consists in causing sulphur dichloride to act upon 2:5-diarylidobenzoquinones.

2. As a new process, the manufacture of vat dyestuffs, which consists in causing sulphur dichloride to act upon 2:5-diarylidobenzoquinones in presence of a diluent.

3. As a new process, the manufacture of vat dyestuffs, which consists in causing sulphur dichloride to act upon 2:5-dianilidobenzoquinone.

4. As a new process, the manufacture of vat dyestuffs, which consists in causing sulphur dichloride to act upon 2:5-dianilidobenzoquinone in presence of a diluent.

5. As new products, the dyestuffs obtained from 2:5-diarylidobenzoquinones and sulphur dichloride, which form dark yellow to dark blue and black powders, dissolving in concentrated sulphuric acid to brown to red-violet and blue-green solutions and giving with hydrosulphite and caustic soda lye bright yellow to brown vats from which wool is dyed fast yellow-brown to red-brown, olive-green, green-blue and grey tints.

6. As new products, the dyestuffs obtained from 2:5-diarylidobenzoquinones and sulphur dichloride containing sulphur and also chlorine, which form dark yellow to dark blue and black powders, dissolving in concentrated sulphuric acid to brown to red-violet and blue-green solutions and giving with hydrosulphite and caustic soda lye bright yellow to brown vats from which wool is dyed fast yellow-brown to red-brown, olive-green, green-blue and grey tints.

7. As new products, the dyestuffs obtained from 2:5-dianilidobenzoquinone and sulphur dichloride containing sulphur and also chlorine, which form dark yellow to dark blue and black powders, dissolving in concentrated sulphuric acid to red-violet to blue-violet solutions and giving with hydrosulphite and caustic soda lye bright yellow to brown vats from which wool is dyed fast yellow-brown to red-brown, violet-brown and black-brown tints.

8. Material dyed with the dyestuffs of claim 5.

9. Material dyed with the dyestuffs of claim 6.

10. Material dyed with the dyestuffs of claim 7.

In witness whereof I have hereunto signed my name this 1st day of October, 1924.

JAROSLAV FRÖHLICH.